(12) United States Patent
Anderson

(10) Patent No.: US 11,195,348 B2
(45) Date of Patent: Dec. 7, 2021

(54) SYSTEM AND METHOD FOR DETERMINING A PRIORITY OF MONITORING A MACHINE

(71) Applicant: Caterpillar Inc., Deerfield, IL (US)

(72) Inventor: Erik J. Anderson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 227 days.

(21) Appl. No.: 16/396,861

(22) Filed: Apr. 29, 2019

(65) Prior Publication Data

US 2020/0342695 A1 Oct. 29, 2020

(51) Int. Cl.
*G07C 5/08* (2006.01)
*G07C 5/00* (2006.01)

(52) U.S. Cl.
CPC .......... *G07C 5/0808* (2013.01); *G07C 5/006* (2013.01); *G07C 5/008* (2013.01); *G07C 5/0841* (2013.01)

(58) Field of Classification Search
CPC ...... G07C 5/0808; G07C 5/006; G07C 5/008; G07C 5/0841; G05B 2219/2616; G05B 23/0283; G05B 23/0218
See application file for complete search history.

(56) References Cited

U.S. PATENT DOCUMENTS

| | | | |
|---|---|---|---|
| 6,484,106 B1 | 11/2002 | Schoch | |
| 7,653,512 B2 | 1/2010 | Cheung et al. | |
| 9,497,422 B2 | 11/2016 | Mitsuta et al. | |
| 2007/0173993 A1 | 7/2007 | Nielsen et al. | |
| 2007/0179640 A1 | 8/2007 | Moughler et al. | |
| 2008/0133178 A1* | 6/2008 | Byrne | G05B 23/0283 702/184 |
| 2009/0217101 A1 | 8/2009 | Becker | |
| 2014/0223235 A1* | 8/2014 | Gundlapalli | H04Q 9/00 714/27 |
| 2018/0005461 A1 | 1/2018 | Steketee et al. | |
| 2018/0047224 A1* | 2/2018 | Clark, IV | G07C 5/008 |
| 2018/0113442 A1 | 4/2018 | Nixon et al. | |
| 2018/0120133 A1 | 5/2018 | Blank et al. | |
| 2018/0174246 A1 | 6/2018 | Varela et al. | |

FOREIGN PATENT DOCUMENTS

| | | |
|---|---|---|
| JP | H04344967 | 12/1992 |
| KR | 101630692 | 6/2016 |

* cited by examiner

*Primary Examiner* — Michael V Kerrigan
(74) *Attorney, Agent, or Firm* — Bookoff McAndrews PLLC

(57) ABSTRACT

A system for determining a priority of monitoring a machine is provided. The system includes a data acquisition module disposed in communication with a sensor. The data acquisition module is configured to generate data based on at least an operational parameter associated with the machine. The system further includes a server configured to determine a first factor indicative of a rate of usage of the machine, a second factor indicative of a number of exceptions of the machine at corresponding severities, a third factor indicative of a risk of unscheduled downtime of the machine, a fourth factor indicative of a distance from a preventive maintenance of the machine, a fifth factor indicative of an importance of a sub-system of the machine, and the priority of monitoring the machine based on at least the first factor, the second factor, the third factor, the fourth factor and the fifth factor.

20 Claims, 9 Drawing Sheets

|    | b1 | c1 | g1 | h1 | l1 | n1 |
|----|----|----|----|----|----|----|
| a1 |    | x  | x  | x  |    | x  |
| b1 | -  |    | x  |    |    |    |
| c1 | -  | -  |    |    |    |    |
| g1 | -  | -  | -  |    |    |    |
| h1 | -  | -  | -  | -  |    | x  |
| l1 | -  | -  | -  | -  | -  | x  |
| n1 | -  | -  | -  | -  | -  | -  | a1 - ENGINE ABUSE EVENTS
b1 - PAYLOAD OVERLOAD EVENTS
c1 - FUEL CONSUMPTION RATE
g1 - NUMBER OF UNSCHEDULED DOWNTIME EVENTS ON ENGINES
h1 - NUMBER OF INJECTOR FAILURES
l1 - NUMBER OF BAD SAMPLES
n1 - MEAN TIME BETWEEN FILTER CHANGE

*FIG. 3C*

SYSTEM AND METHOD FOR DETERMINING A PRIORITY OF MONITORING A MACHINE

TECHNICAL FIELD

The present disclosure relates to a system and a method for determining a priority of monitoring a machine. More particularly, the present disclosure relates to a system and a method for determining a priority of monitoring a machine from a plurality of machines.

BACKGROUND

Generally, a number of machines may work on a worksite during operations, such as mining, construction, material handling, and so on. The machines may typically be monitored, such as by a fleet or worksite management system, in order to monitor work progress of each of the machines and/or the worksite, health of each of the machines, and so on. In situations, when one or more of the machines may break down or may develop faults in the respective components or systems, technicians present on the worksite may be assigned to inspect and/or repair the damaged machines.

However, in some situations, the worksite may have a relatively large work area with a relatively large number of machines present and working on the worksite during a typical work cycle. In many situations, a number of technicians present on the worksite to attend to the damaged machines may be considerably lower than the number of machines working on the worksite. In some situations, the number of damaged machines on the worksite may become substantially greater than the number of technicians present on the worksite. As a result, it may be difficult for the technicians to prioritize machines according to the respective problems and attend to the damaged machines effectively, in turn, increasing downtime, reducing productivity, and increasing costs. Hence, there is a need for an improved system for determining a priority of monitoring the machines.

U.S. Patent Application Number 2007/0173993 describes a system and a method for monitoring an actionable metric associated with a fleet. A first data set is received that includes fleet management data for the fleet. A second data set is received that includes field service data associated with the fleet. A third data set is received that includes vehicle diagnostic data and/or vehicle positioning data. A performance indicator is calculated using data elements associated with at least two of the three data sets. An actionable metric is reported, based upon the performance indicator.

SUMMARY OF THE DISCLOSURE

In an aspect of the present disclosure, a system for determining a priority of monitoring a machine is provided. The system includes a data acquisition module disposed in communication with a sensor. The sensor is configured to determine an operational parameter associated with the machine. The data acquisition module is configured to generate data based on at least the operational parameter associated with the machine. The system further includes a server disposed in communication with the data acquisition module. The server is configured to determine a first factor based on the data obtained from the data acquisition module. The first factor is indicative of a rate of usage of the machine. The server is configured to determine a second factor based on the data obtained from the data acquisition module. The second factor is indicative of a number of exceptions of the machine at corresponding seventies. The server is configured to determine a third factor based on the data obtained from the data acquisition module. The third factor is indicative of a risk of unscheduled downtime of the machine. The server is configured to determine a fourth factor based on the data obtained from the data acquisition module. The fourth factor is indicative of a distance from a preventive maintenance of the machine. The server is also configured to determine a fifth factor based on a user input obtained at a user interface and the data obtained from the data acquisition module. The fifth factor is indicative of an importance of a sub-system of the machine. The server is further configured to determine the priority of monitoring the machine based on at least the first factor, the second factor, the third factor, the fourth factor and the fifth factor.

In another aspect of the present disclosure, a computer-implemented method for determining a priority of monitoring a machine is provided. The method includes determining, by a sensor, an operational parameter associated with the machine. The method includes generating, by a data acquisition module, data based on at least the operational parameter associated with the machine. The method includes determining, by a server, a first factor based on the data obtained from the data acquisition module. The first factor is indicative of a rate of usage of the machine. The method includes determining, by the server, a second factor based on the data obtained from the data acquisition module. The second factor is indicative of a number of exceptions of the machine at corresponding seventies. The method includes determining, by the server, a third factor based on the data obtained from the data acquisition module. The third factor is indicative of a risk of unscheduled downtime of the machine. The method includes determining, by the server, a fourth factor based on the data obtained from the data acquisition module. The fourth factor is indicative of a distance from a preventive maintenance of the machine. The method also includes determining, by the server, a fifth factor based on a user input obtained at a user interface and the data obtained from the data acquisition module. The fifth factor is indicative of an importance of a sub-system of the machine. The method further includes determining, by the server, the priority of monitoring the machine based on at least the first factor, the second factor, the third factor, the fourth factor and the fifth factor.

In yet another aspect of the present disclosure, a system for determining a priority of monitoring a plurality of machines is provided. The system includes a data acquisition module disposed in communication with a sensor. The sensor is configured to determine an operational parameter associated with a corresponding machine of the plurality of machines. The data acquisition module is configured to generate data based on at least the operational parameter associated with the corresponding machine. The system further includes a server disposed in communication with the data acquisition module. The server is configured to determine a first factor for the corresponding machine based on the data obtained from the data acquisition module. The first factor is indicative of a rate of usage of the machine. The server is configured to determine a second factor for the corresponding machine based on the data obtained from the data acquisition module. The second factor is indicative of a number of exceptions of the machine at corresponding seventies. The server is configured to determine a third factor for the corresponding machine based on the data obtained from the data acquisition module. The third factor is indicative of a risk of unscheduled downtime of the machine. The server is configured to determine a fourth factor for the corresponding machine based on the data obtained from the data acquisition module. The fourth factor is indicative of a distance from a preventive maintenance of the machine. The server is also configured to determine a fifth factor for the corresponding machine based on a user input obtained at a user interface and the data obtained from the data acquisition module. The fifth factor is indicative of an importance of a sub-system of the corresponding machine. The server is further configured to determine the priority of monitoring the corresponding machine based on at least the first factor, the second factor, the third factor, the fourth factor and the fifth factor.

Other features and aspects of this disclosure will be apparent from the following description and the accompanying drawings.

BRIEF DESCRIPTION OF THE DRAWINGS

FIG. 3C is an exemplary graphical representation for determining a third factor, according to one embodiment of the present disclosure;

DETAILED DESCRIPTION

Figure 1:
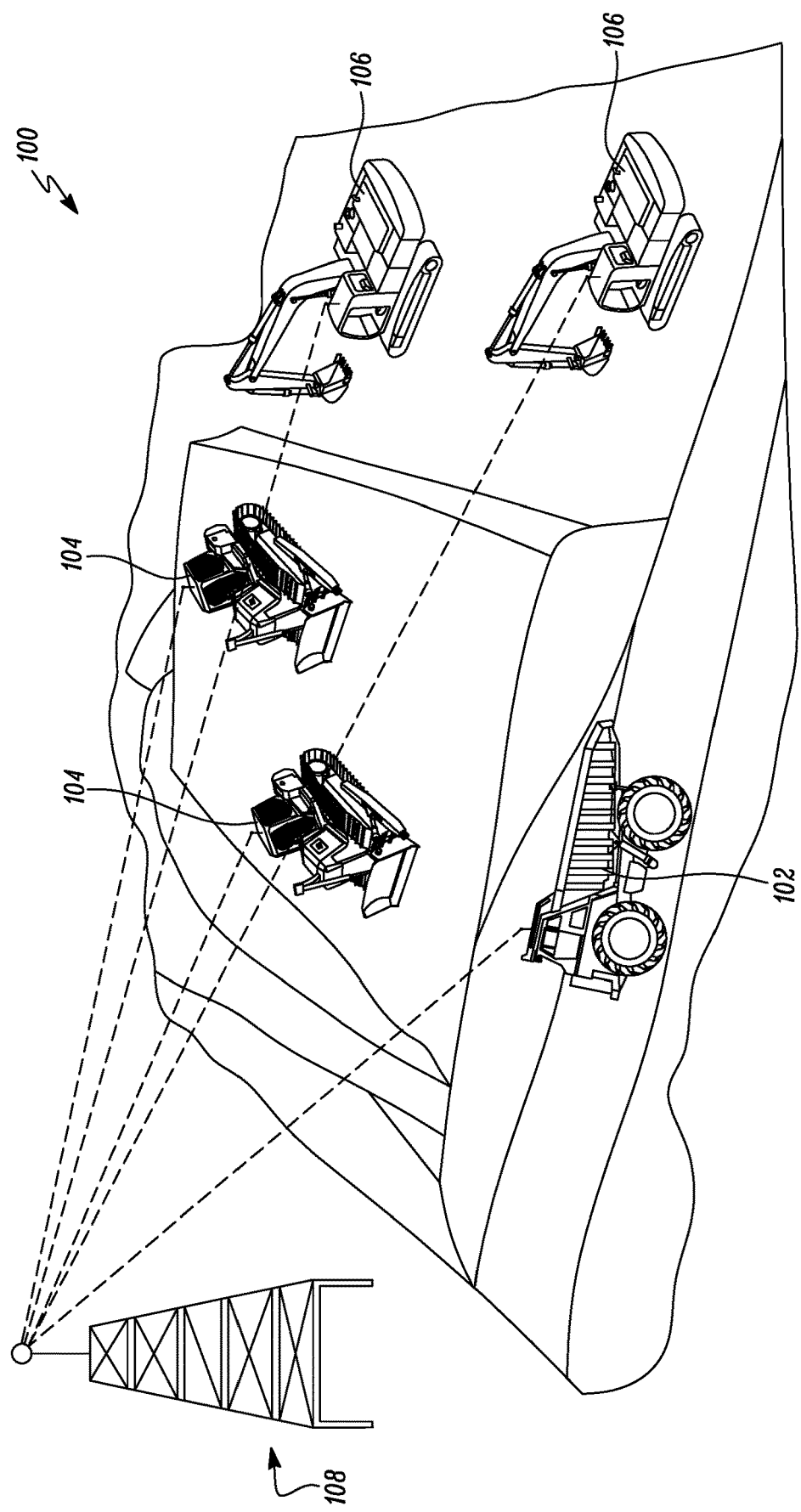
FIG. 1 is a schematic representation of an exemplary worksite, according to one embodiment of the present disclosure.

Wherever possible, the same reference numbers will be used throughout the drawings to refer to the same or like parts. Referring to FIG. 1, an exemplary worksite 100 is illustrated. In the illustrated embodiment, the worksite 100 is a construction site. In other embodiments, the worksite 100 may be any worksite, such as a mine site, a seaport, an airport, a warehouse, a material handling site, a waste management site, and so on. The worksite 100 includes a plurality of machines 102, 104, 106. In the illustrated embodiment, the plurality of machines 102, 104, 106 includes three types of machines, such as an off-highway truck, a track type tractor, and a hydraulic excavator, respectively. In other embodiments, each of the plurality of machines 102, 104, 106 may include any machine, such as a backhoe loader, a motor grader, a paver, a compactor, a cold planar, a crane, a shovel, a forklift, an on-highway truck, and so on. Also, it should be noted that number of each of the machines 102, 104, 106 shown in the accompanying figure is merely exemplary and may vary, based on application requirements.

The worksite 100 also includes a control center 108. In the illustrated embodiment, the control center 108 is shown adjacent to the worksite 100. In other embodiments, the control center 108 may be provided within the worksite 100 or remotely with respect to the worksite 100, based on application requirements. The control center 108 is adapted to house one or more systems associated with the worksite 100, such as a worksite control system, a worksite monitoring system, a worksite surveillance system, a communication system, a power system, a data center, worksite personnel, and so on.

Figure 2:
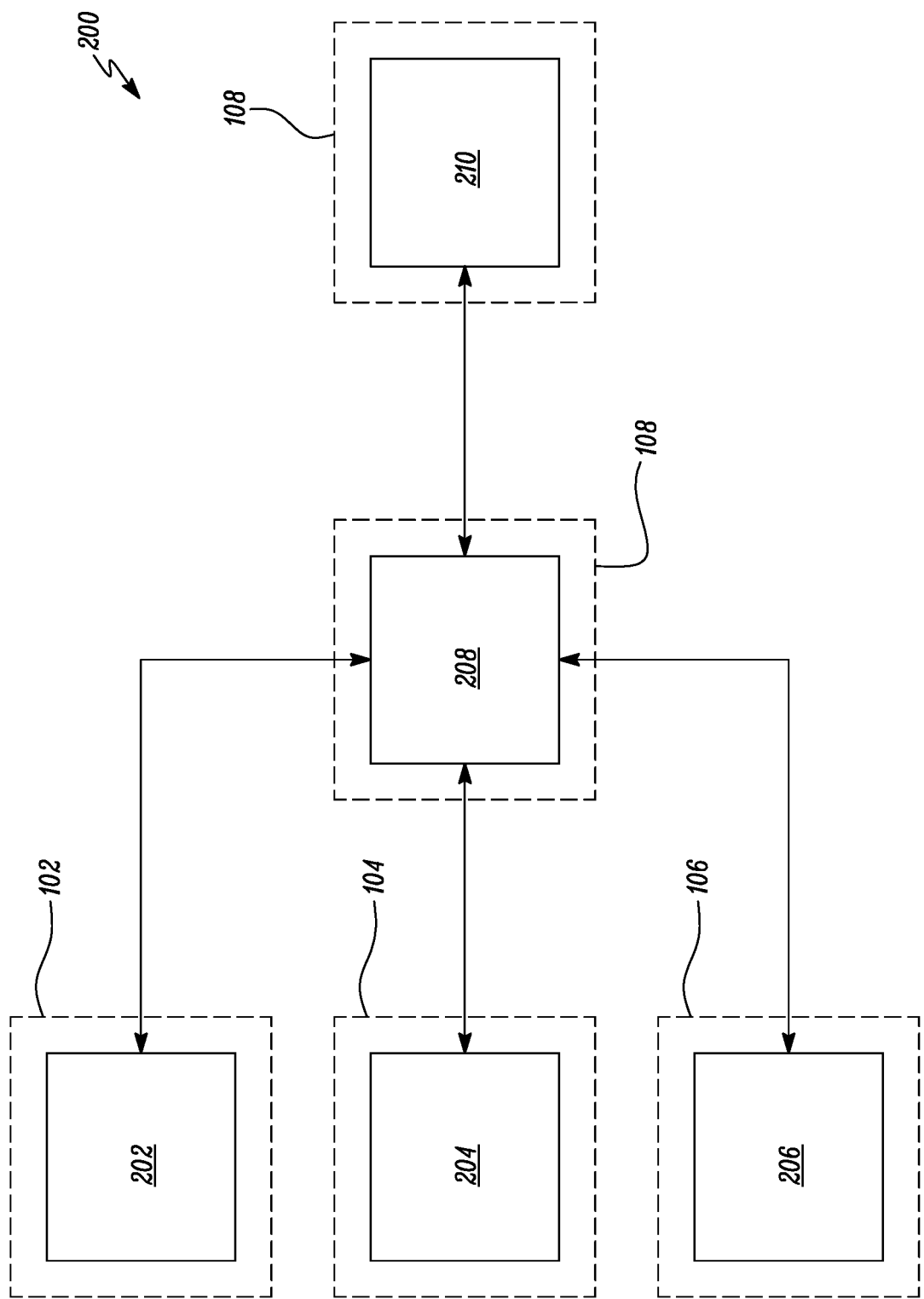
FIG. 2 is a schematic representation of a system for determining a priority of monitoring a machine, according to one embodiment of the present disclosure.

The present disclosure relates to a system 200 for determining a priority of monitoring the plurality of machines 102, 104, 106. Referring to FIG. 2, a block diagram of the system 200 is illustrated. Each of the plurality of machines 102, 104, 106 includes a corresponding sensor 202, 204, 206. In an embodiment, the system 200 may include the sensor 202, 204, 206 disposed on each of the plurality of machines 102, 104, 106, respectively. In an alternative embodiment, the sensor 202, 204, 206 may not be part of the system 200. The sensor 202, 204, 206 is configured to determine an operational parameter associated with a corresponding machine 102, 104, 106 of the plurality of machines 102, 104, 106, respectively. For example, in one embodiment, the sensor 202, 204, 206 may be a ground speed sensor configured to determine an operating speed of the machine 102, 104, 106, respectively. In another embodiment, the sensor 202, 204, 206 may be an engine speed sensor configured to determine an operating speed of an engine of the machine 102, 104, 106, respectively.

In another embodiment, the sensor 202, 204, 206 may be a temperature sensor configured to determine an ambient temperature or an operating temperature of the engine of the machine 102, 104, 106, respectively. In another embodiment, the sensor 202, 204, 206 may be a pressure sensor configured to determine an ambient pressure or an operating pressure of a hydraulic or fuel system of the machine 102, 104, 106, respectively. In yet another embodiment, the sensor 202, 204, 206 may be a fuel sensor configured to determine a consumption of fuel by the engine of the machine 102, 104, 106, respectively. It should be noted that the sensor 202, 204, 206 described herein is merely exemplary and may vary, based on application requirements.

The system 200 includes a data acquisition module 208. The data acquisition module 208 is disposed in communication with the sensor 202, 204, 206. In the illustrated embodiment, the data acquisition module 208 is disposed within the control center 108. In another embodiment, the data acquisition module 208 may be disposed remotely with respect to the worksite 100 or the control center 108, such as on a cloud platform. In another embodiment, the data acquisition module 208 may be located onboard one or more of the machines 102, 104, 106.

In another embodiment, the data acquisition module 208 may be a data provider separate from each of the machine 102, 104, 106 and/or the worksite 100. In another embodiment, the data acquisition module 208 may be a telematics unit, such as a datalogger. In yet another embodiment, the data acquisition module 208 may include data received from a manual inspection or entry by a user, a Customer Relationship Management (CRM) software, and so on. The data acquisition module 208 is configured to generate data based on at least the operational parameter associated with the corresponding machine 102, 104, 106. In some embodiments, the data may also include historical information of prior events, such as previous faults, failures, and/or breakdowns of the corresponding machine 102, 104, 106 or sub-systems thereof.

The system 200 further includes a server 210. In the illustrated embodiment, the server 210 is disposed within the control center 108. In other embodiments, the server 210 may be disposed remotely with respect to the worksite 100 or the control center 108, such as on the cloud platform, a central server station, and so on. The server 210 is disposed in communication with the data acquisition module 208. The system 200 will now be explained with reference to the machine 102. It should be noted that the system 200 will function with each of the machines 104, 106 in a manner similar to a manner described herein with reference to the machine 102.

The server 210 is configured to determine a first factor (A) based on the data obtained from the data acquisition module 208. In the illustrated embodiment, the first factor (A) is indicative of a rate of usage (ROU) of the machine 102. More specifically, the server 210 is configured to determine the first factor (A) based on a number of hours of usage of the machine 102 for a predetermined time duration. Accordingly, the rate of usage (ROU) of the machine 102=number of hours of usage of the machine 102/predetermined time duration. The number of hours of usage of the machine 102 may be received from the telematics unit, such as the datalogger associated with the machine 102. As such, the rate of usage (ROU) of the machine 102 relates to usage of the machine 102 for the predetermined time duration, such as twenty-four (24) hours or a number of hours in a working day. A value of the first factor (A) may vary between zero (0) and one (1). A higher value of the first factor (A) relates to a higher risk of failure of the machine 102 and vice versa. It should be noted that the first factor (A), viz., the rate of usage (ROU) of the machine 102 is a machine or system level factor.

Figure 3A:
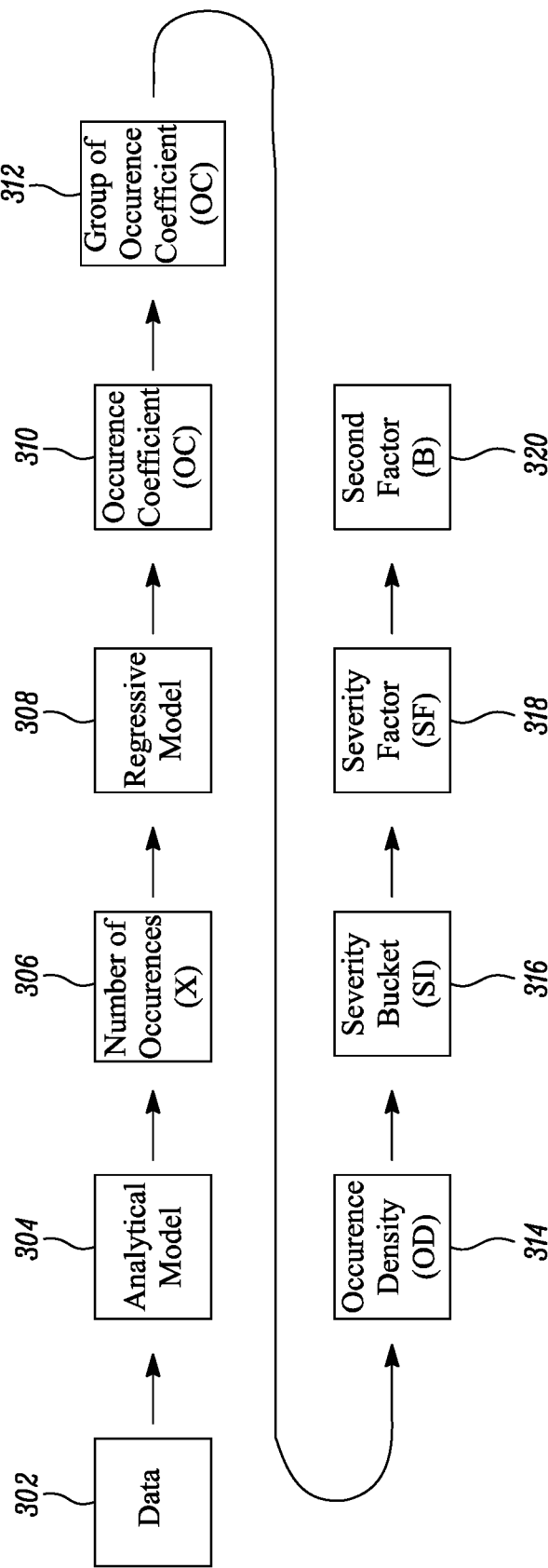
FIG. 3A is a schematic representation for determining a second factor, according to one embodiment of the present disclosure.

The server 210 is also configured to determine a second factor (B) for the machine 102 based on the data obtained from the data acquisition module 208. The second factor (B) is indicative of a number of exceptions of the machine 102 at corresponding severities. A method for determining the second factor (B) will now be explained with reference to FIG. 3A. Referring to FIG. 3A, at block 302, the data is obtained from one or more data sources, such as the sensor 202 associated with the machine 102 and the data acquisition module 208. The data source may include a trend, a fluid data, an event data, an inspection data, telematics, a sensor data, the datalogger, and so on. At block 304, the data is fed into an analytical model. At block 306, the analytical model is configured to determine a number of occurrences (X) of each of a plurality of exceptions based on the data obtained from the data acquisition module 208.

The plurality of exceptions may include failures for a predetermined time duration, such as a workday. The plurality of exceptions is associated with a sub-system from a plurality of sub-systems of the machine 102. The sub-system of the machine 102 may be any component or sub-system associated with the machine 102, such as a hydraulic system, a control system, a traction system, an implement control system, an engine or power source, a transmission system, a braking system, a cooling system, a suspension system, and so on. Each of the plurality of exceptions further includes a corresponding severity level.

For example, the analytical model outputs the number of occurrences (X) per exception for the sub-system of the machine 102. Each exception has an associated severity level. A higher number of occurrences (X) is indicative of a higher confidence or probability of an actual occurrence of the corresponding exception. The exception may be a hydraulic failure, a low pressure of the braking system, a sensor failure in the braking system, and so on. In an example, the severity level may vary between 1 to five (5) for each sub-system of the plurality of sub-systems. For example, a sensor failure may have a lowest severity, such as 5, a hydraulic failure may have a highest severity, such as 1, and so on.

At block 310, the server 210 determines a plurality of occurrence coefficients (OC) corresponding to the plurality of exceptions. Each of the plurality of occurrence coefficients (OC) is determined based on the number of occurrences (X) of the corresponding exception. More specifically, at block 308, the occurrence coefficient for the corresponding exception is determined based on the number of occurrences (X) using one or more regressive models, such as a Pass-Through (PT) model, a SPSS model, a Smart Signal (SS) model, an OSI model, and so on. Each of the plurality of occurrence coefficients (OC) includes the severity level of the corresponding exception.

TABLE NO. 01

| Model | One Occurrence | 95% Probability |
|-------|----------------|-----------------|
| SPSS  | 1/6            | 6               |
| SS    | 1/3            | 3               |
| OSI   | 1/72           | 72              |
| PT    | 1              | 1               |

For example, the occurrence coefficient (OC) in the SPSS model is calculated by an equation: $(1+X^3)/(X^3+X+4)$. Referring to Table No. 01, in the SPSS model, an occurrence of 6 events results in 95% probability of occurrence of the respective event. In another example, the occurrence coefficient (OC) in the SS model is calculated by an equation: $(1+X^4)/(X^4+X+1)$. Referring to Table No. 01, in the SS model, an occurrence of 3 events results in 95% probability of occurrence of the respective event. In another example, the occurrence coefficient (OC) in the OSI model is calculated by an equation: $(1+X^2)/(X^2+3X+69)$. Referring to Table No. 01, in the OSI model, an occurrence of 72 events results in 95% probability of occurrence of the respective event. In another example, the occurrence coefficient (OC) in the PT model is calculated by an equation: $(1+1)$. Referring to Table No. 01, in the PT model, an occurrence of 1 event results in 95% probability of occurrence of the respective event.

At block 312, each of the plurality of occurrence coefficients (OC) is arranged into one or more groups of occurrence coefficients (OC). Each group of the occurrence coefficients (OC) includes a severity level similar to one another. At step 314, the server 210 determines an occurrence density (OD) of each group of occurrence coefficients (OC) based on the occurrence coefficients (OC) in a corresponding group. More specifically, the occurrence density (OD) for the exceptions per severity per sub-system is determined based on the occurrence coefficients (OC) per severity for the corresponding sub-system.

For example, the occurrence density (OD) may be calculated using an equation:

$$OD = \frac{5}{\prod_{n=1}^{n}(OC)_n + 5}$$

-continued where, $$\prod_{n=1}^{n} = (OC)_1(OC)_2(OC)_3 \ldots (OC)_n$$

Figure 3B:
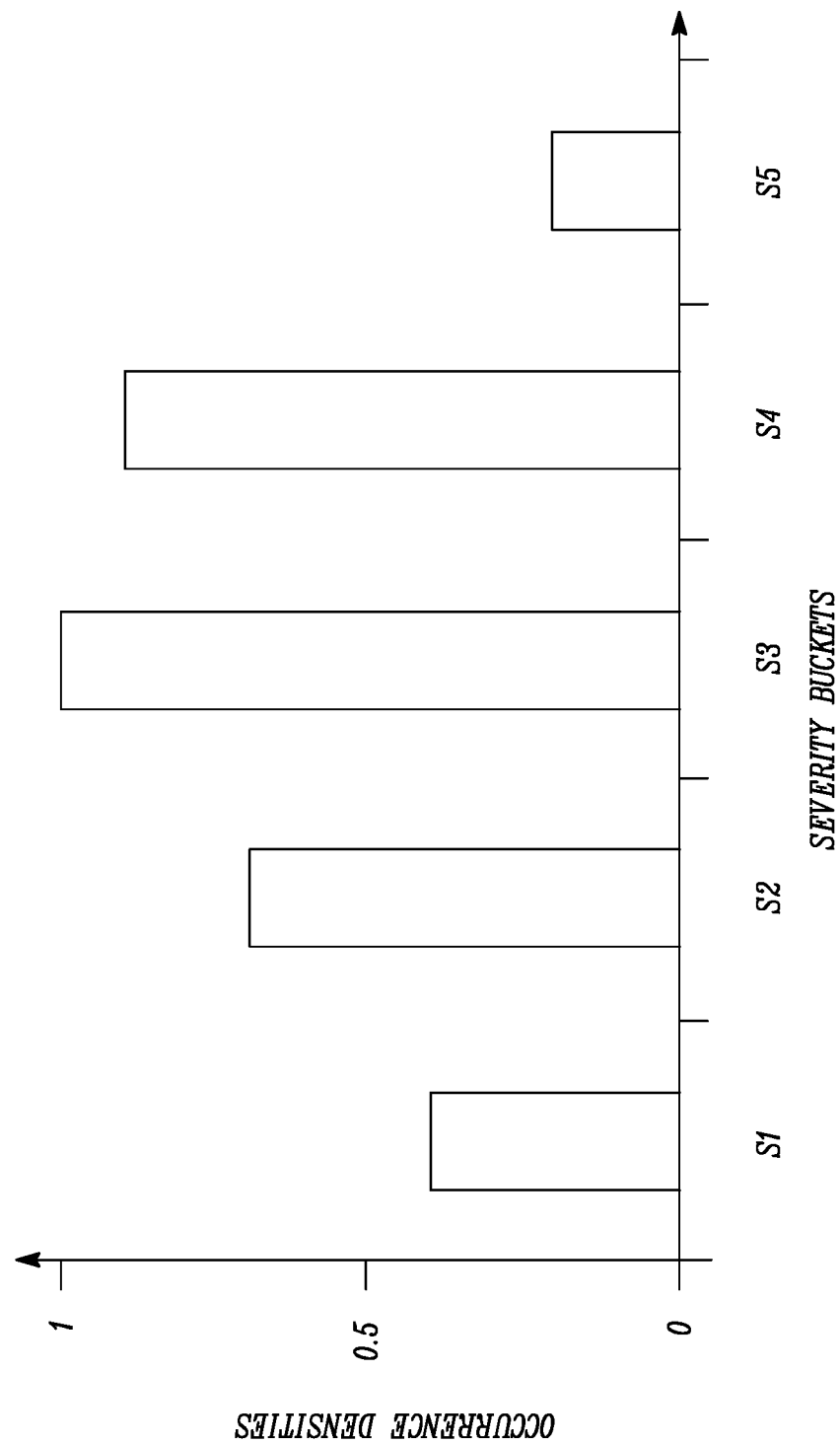
FIG. 3B is an exemplary graphical representation of occurrence densities arranged in different severity buckets, according to one embodiment of the present disclosure.

At block 318, the server 210 determines a severity factor (SF) of the sub-system based on the occurrence density (OD) of each group of occurrence coefficients (OC). More specifically, at block 316, each of the occurrence densities (OD) is arranged in a number of severity buckets (SI), such as Si, S2, S3, S4, S5, and so on, as shown in FIG. 3B. As such, similar severities are grouped together. The severity factor (SF) is then determined, at block 318, with higher weightage attached to higher severities. As such, the severity factor (SF) corresponds to the corresponding sub-system for the machine 102.

For example, the severity factor (SF) is calculated using an equation:

$$SF = OD(S1)\frac{1}{\sigma} + OD(S2)\frac{1}{\sigma^2} + OD(S3)\frac{1}{\sigma^3} + OD(S4)\frac{1}{\sigma^4} + OD(S5)\frac{1}{\sigma^5}$$

where, $\sigma$ = Golden Ratio = 1.965948237

Figure 3D:
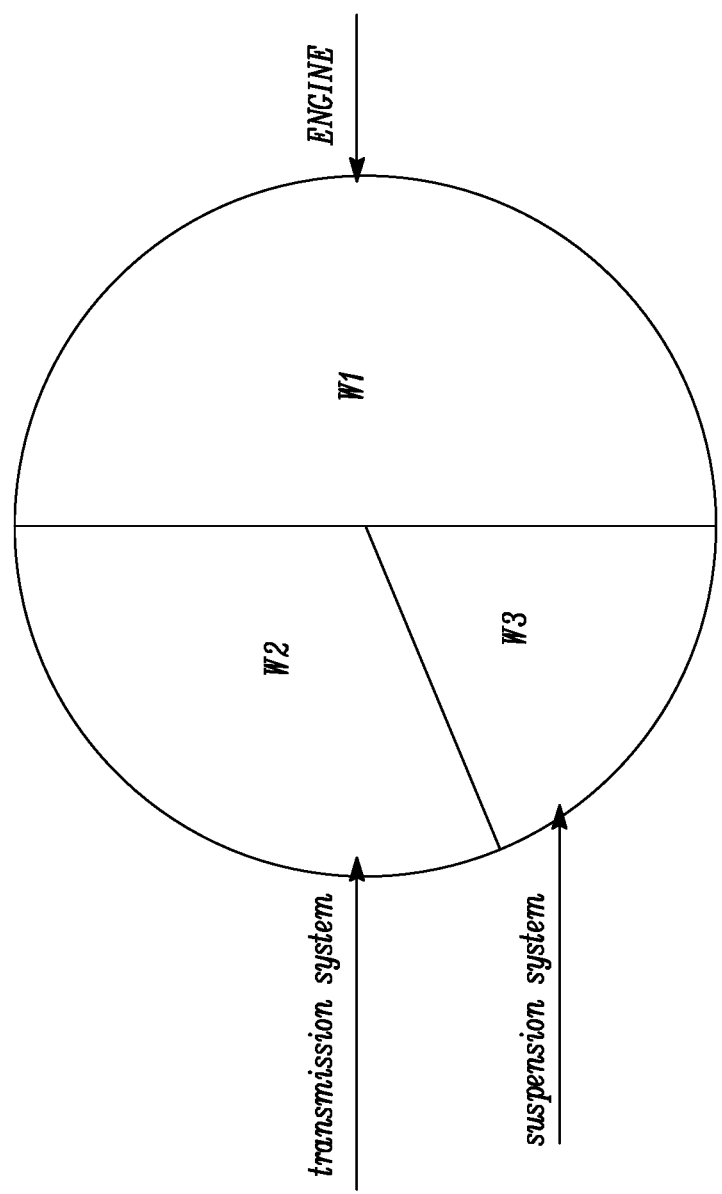
FIG. 3D is an exemplary graphical representation showing different weights associated with different sub-systems of the machine, according to one embodiment of the present disclosure.

At step 320; the server 2.10 is configured to determine the second factor (B) based on the severity factor (SF) of each of the plurality of sub-systems of the machine 102 and a weight associated with each of the plurality of sub-systems. More specifically, the machine 102 includes a number of severity factors (SF) corresponding to the number of sub-systems. For machine or system level determination of the second factor (B), a weight is attached to each severity factor (SF) based on the importance of the sub-system. For example, referring to FIG. 3D, the engine may have a weight (W1) higher than a weight (W2) of the transmission system. Also, the weight (W2) of the transmission system is higher than a weight (W3) of the suspension system. A weighted average is then determined for the machine 102. In the accompanying figure, weights associated with three different sub-systems of the machine 102 are illustrated. In other embodiments, weights associated with any number of sub-systems of the machine 102 may be considered.

In some situations, the determination may be made across all the machines 102 of a particular model, such as a mining truck model, by determining an average of the severity factors (SF) for the machines 102 with weights being considered the same for all the machines 102 of the same model. Alternatively, the severity factor (SF) for one machine 102 of a particular model may be considered uniform across all the other machines 102 of the same model. As such, the second factor (B), viz., the number of exceptions of the machine 102 at corresponding seventies is determined. A value of the second factor (B) at corresponding seventies may vary between 0 and 1. A higher value of the number of exceptions of the machine 102 at corresponding seventies relates to a higher risk of failure of the machine 102 and vice versa. It should be noted that the second factor (B), viz., the number of exceptions of the machine 102 at corresponding seventies is a machine or system level factor.

The system 200 is also configured to determine a third factor (C) for the machine 102 based on the data obtained from the data acquisition module 208. In the illustrated embodiment, the third factor (C) is indicative of a risk of unscheduled downtime (RUD) of the machine 102. More specifically, in one embodiment, the server 210 is configured to determine the third factor (C) based on a complexity of the machine 102. In one embodiment, the complexity of the machine 102 may refer to different types of sub-systems present on the machine 102, such as type of the hydraulic systems, type of the control systems, a type of the traction system, type of the implement control system, a type of the engine or power source, a type of the transmission system, and so on. In another embodiment, the complexity of the machine 102 may refer to a number of sub-systems on the machine 102, such as a number of brakes, a number of the hydraulic systems, a number of the control systems, and so on.

In another embodiment, the complexity of the machine 102 may refer to a level of automation present on the machine 102, and so on. In another embodiment, the server 210 is configured to determine the third factor (C) based on a power rating of the machine 102, such as Horse Power (HP), Brake Horse Power (BHP), Kilowatt (kW), and so on. For example, a wheel loader has a higher level of complexity per HP relative to a water truck. In another embodiment, the server 210 is configured to determine the third factor (C) based on a number of sub-system abuse events associated with the machine 102, such an engine overheat event, a brake overheat event, a transmission overheat event, an overtime operation event of the engine, a high-speed operation event of the engine, and so on. In another embodiment, the server 210 is configured to determine the third factor (C) based on a number of payload overload events associated with the machine 102.

In another embodiment, the server 210 is configured to determine the third factor (C) based on a fuel consumption rate of the machine 102, such as a low or high fuel rate consumption of the machine 102. In another embodiment, the server 210 is configured to determine the third factor (C) based on a number of unscheduled downtime events of the sub-system of the machine 102, such as an engine failure event, a braking system failure event, a transmission failure event, a hydraulic system failure event, a cooling system failure event, and so on. In another embodiment, the server 210 is configured to determine the third factor (C) based on a number of injector failures of the machine 102, such as failure of one or more fuel injectors associated with the engine, failure of one or more dosing injectors associated with an aftertreatment system of the machine 102, and so on.

In another embodiment, the server 210 is configured to determine the third factor (C) based on a mean time between filter change of the machine 102, such an engine oil filter, a hydraulic oil filter, an intake air filter, a coolant filter, a fuel filter, and so on. It should be noted that parameters to determine the third factor (C) described herein are merely exemplary and may vary, based on application requirements. The third factor (C) is determined based on multiple parameters and is dependent on the complexity of the machine 102 and an importance of the machine 102 on the worksite 100. In some embodiments, a rate of change (ROC) of some parameters may be determined, such as a change of the engine speed, a change of the ground speed of the machine 102, and so on. In some embodiments, an interaction between various parameters may also be considered. A value of the third factor (C) may vary between 0 and 1. A higher value of the third factor (C) relates to a higher risk of failure of the machine 102 and vice versa. It should be noted that the third factor (C), viz., the risk of unscheduled downtime (RUD) of the machine 102 is a machine or system level factor.

In one example, with combined reference to FIG. 3C, the third factor (C) may be calculated using an equation:

$$C = U*Y*[W*(V+Z)+X2]$$

where, U=HP coefficient=0.1 to 1

For calculating "Y", in a situation when mean time between filter change (n1) increases, then, $$Y = ROC(n1),$$

where, ROC=rate of change

In a situation when Sample Grade improves, i.e., when mean time between filter change (n1) decreases, then, $$Y = ROC(\text{Sample Grade})$$

Accordingly, considering both (n1) and Sample Grade, then, $$Y = [1+ROC(n1)]*[1+ROC(\text{Sample Grade})]$$

In such a situation, the ROC may be factored using a last point/last three points.

In order to calculate percentage of downtime events that are engine abuse related W, $$W = (a1/g1), \text{ and has a monthly frequency,}$$

where,
a1=engine abuse events,
g1=number of unscheduled downtime events on the engine.

For calculating "V", when the engine abuse events (a1) increase and fuel consumption rate (c1) is affected, then, $$V = \text{Abs}[ROC(c1)],$$

where, Abs=Absolute value.

When the fuel consumption rate (c1) increases substantially per small change in the engine abuse events (a1), and if $$ROC(a1/ROU) > 0, \text{ then,}$$

$$V = \text{Abs}[ROC(c1)]/[ROC(a1)/ROU], \text{ and has a weekly}$$

or monthly frequency.

For calculating "Z", in a situation when ROC (h1)<−0.05, then, $$Z = 0,$$

where,
h1=number of injector failures.

In a situation when −0.05<ROC (h1)<0.05, then, $$Z = [1+ROC(a1)][1+ROC(n1)]$$

In a situation when ROC (h1)>0.05, then, $$Z = [2+ROC(a1)][2+ROC(n1)]$$

The ROC (a1) may have a monthly or yearly frequency. The ROC (h1) may have a monthly or yearly frequency. The ROC (n1) may be factored using a last point or last three points.

In order to calculate percentage of downtime events that are payload related X2, $$X2 = (b1/g1), \text{ and has a monthly frequency,}$$

where,
b1=payload overload events.

Figure 3E:
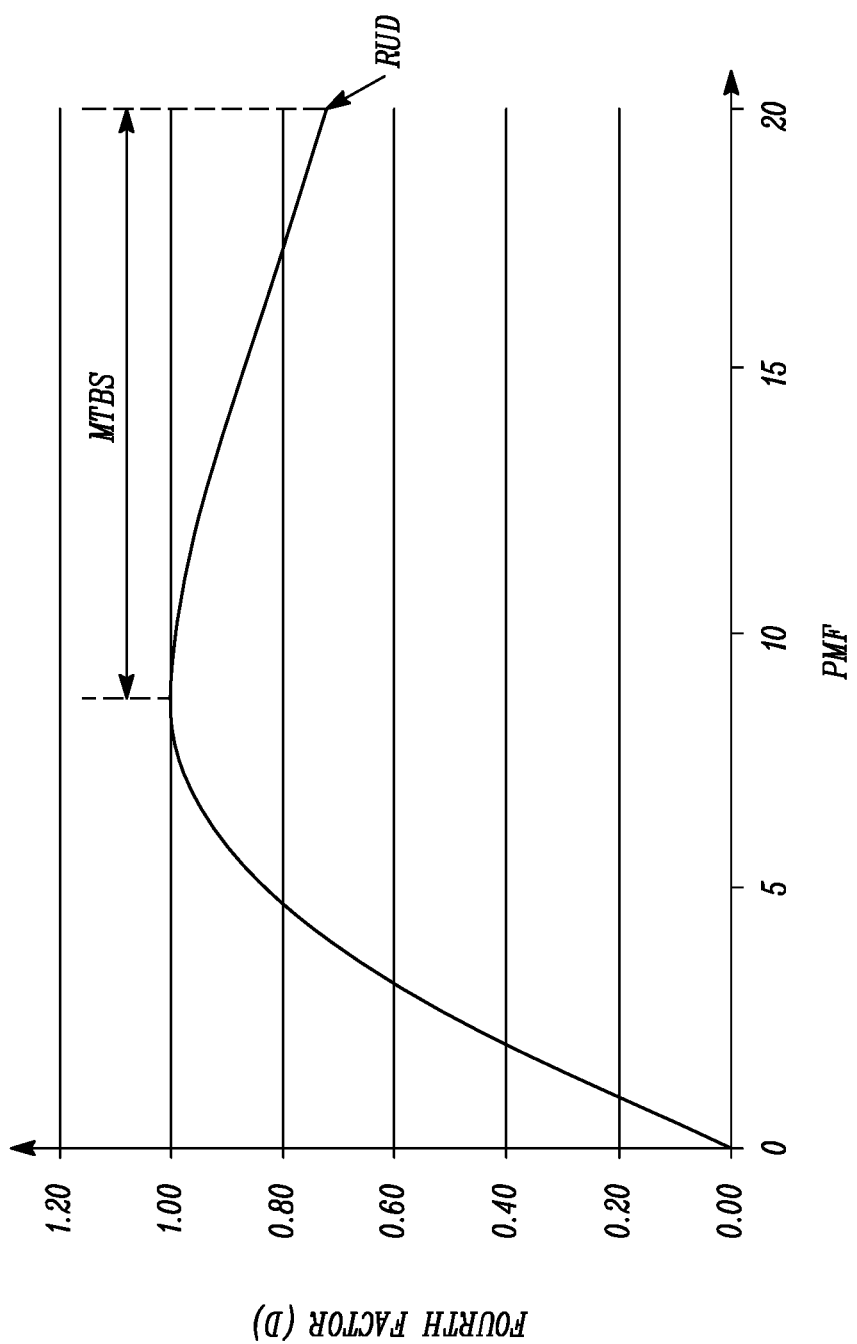
FIG. 3E is an exemplary graphical representation for determining a fourth factor, according to one embodiment of the present disclosure.

The server 210 is also configured to determine a fourth factor (D) for the machine 102 based on the data obtained from the data acquisition module 208. In the illustrated embodiment, with combined reference to FIG. 3E, the fourth factor (D) is indicative of a distance from a preventive maintenance of the machine 102. More specifically, in one embodiment, the server 210 is configured to determine the fourth factor (D) based on at least a number of days from the preventive maintenance (X1). In another embodiment, the server 210 is configured to determine the fourth factor (D) based on a mean time between shutdowns (MTBS) associated with the machine 102, such as between consecutive end of workdays of the machine 102. In another embodiment, the server 210 is configured to determine the fourth factor (D) based on a frequency of the preventive maintenance (PMF) of the machine 102. In another embodiment, the server 210 is configured to determine the fourth factor (D) based on the first factor (A), viz. the rate of usage (ROU) of the machine 102.

In another embodiment, the server 210 is configured to determine the fourth factor (D) based on the third factor (C), viz., the risk of unscheduled downtime (RUD) of the machine 102. A value of the fourth factor (D) may vary between 0 and 1. A higher value of the fourth factor (D) relates to a higher risk of failure of the machine 102 and vice versa. For example, the machine 102 having completed the respective preventive maintenance and not due for another preventive maintenance soon may have a lower value as the machine 102 may have a lower need for monitoring. A time period between consecutive preventive maintenances is important as the machine 102 may have a higher risk for breakdown as the distance from a previous preventive maintenance increase. It should be noted that the fourth factor (D), viz., the distance from the preventive maintenance of the machine 102 is a machine or system level factor. In one embodiment, the fourth factor (D) may be calculated using an equation:

$$D = [(2A+B)*X1]/[(X1^2+B)*(X1+A^2)]$$

where,
X1=number of days from the preventive maintenance,
A=PMF (MTBS)*(ROU)*(1 Day/24 Hours), and
B=[(RUD)*(PMF)$^2$+RUD*A$^2$ 2*(A)*(PMF)]/[(PMF)*(1−RUD)]

The server 210 is also configured to determine a fifth factor (E) for the machine 102 based on a user input obtained at a user interface (not shown). The fifth factor (E) is indicative of a level of importance of the sub-system. The user interface may be any device configured to receive the user input, such as a computer connected to the server 210. The sub-system of the machine 102 may be any component or system associated with the machine 102, such as the hydraulic system, the control system, the traction system, the implement control system, the engine or power source, the transmission system, the braking system, the cooling system, the suspension system, and so on. More specifically, the server 210 is configured to set the fifth factor (E) at a high value (e.g., 1) from a default value (e.g., 0) based on the user input and a potential occurrence of an exception for the sub-system. The high value is indicative of the level of importance of the sub-system. In an embodiment, the server 210 is configured to receive the user input indicative of a high importance level of the sub-system. The server 210 is further configured to determine a number of occurrences of the exception based on the data obtained from the data acquisition module 208. The exception is associated with the sub-system having the high importance level. The server 210 is further configured to set the fifth factor (E) at the high value from the default value if the number of occurrences of the exception is greater than zero.

For example, in one embodiment, the default value of the sub-system, such as the suspension system, may be 0. However, the user (e.g., a dealer) may identify whether a particular sub-system is more important than other sub-systems on the machine 102. Each sub-system of the machine 102 may be categorized into two buckets or levels, viz., the high importance level (based on the user input) and a normal importance level (a default level). For the sub-systems having the normal importance level, the fifth factor (E) is set at the default value of 0. For sub-systems having the high importance level, the server 210 may set the fifth factor (E) at either 0 or 1 depending on the potential occurrences of the exceptions for the sub-systems. In a situation, when the number of occurrences per exception for any of the sub-systems having the high importance level is determined, such as during determination of the second factor (B), the fifth factor (E) for the corresponding sub-systems may be changed from 0 to 1. The number of occurrences per exception may be determined in a similar manner as described with reference to determination of the second factor (B), viz., using the analytical model 304 configured to determine the number of occurrences (X) per exception for the sub-system of the machine 102. Any active exception on the sub-system with the high importance level may result in a value of a corresponding occurrence coefficient (OC) greater than 0 and less than or equal to 100% (0<OC≤100%). If the occurrence coefficient (OC) is greater than 0, the fifth factor (E) may be set at 1. A value of the fifth factor (E) may therefore be either 0 or 1. A higher value of the fifth factor (E) relates to a higher risk of failure of the machine 102 and vice versa. It should be noted that the fifth factor (E), viz., the level of importance of the sub-system is a component or sub-system level factor.

The server 210 is further configured to determine the priority of monitoring the machine 102 based on at least the first factor (A), the second factor (B), the third factor (C), the fourth factor (D) and the fifth factor (E). More specifically, the server 210 is configured to determine the priority of monitoring the machine 102 based on a predetermined relationship between the first factor (A), the second factor (B), the third factor (C), the fourth factor (D) and the fifth factor (E). In the illustrated embodiment, the predetermined relationship is based on an interaction between the first factor (A), the second factor (B), the third factor (C), the fourth factor (D) and the fifth factor (E). The predetermined relationship is also based on a weight associated with each of the first factor (A), the second factor (B), the third factor (C), the fourth factor (D) and the fifth factor (E).

For example, various weights ranging between 0 to 5, or 0 to ten (10), and so on are attached to each of the first factor (A), the second factor (B), the third factor (C), the fourth factor (D), and the fifth factor (E). The weights may be determined based on the relative importance of the factors. In an example, the fifth factor (E) may have the highest importance followed by the fourth factor (D), the first factor (A), the second factor (B) and the third factor (C). Consequently, the fifth factor (E) may be assigned with the greatest weight, while the third factor (C) may be assigned with the smallest weight. The weights assigned to the fourth factor (D), the first factor (A) and the second factor (B) may be chosen accordingly. Further, a composite priority value (PV) is determined based on an equation. The priority value (PV) may be a numerical value. The priority value (PV) may be scaled between 0 and 100. The equation for determining the priority value (PV) is based on the interaction between the first factor (A), the second factor (B), the third factor (C), the fourth factor (D) and the fifth factor (E). For example, in one embodiment, the priority value (PV) may be determined using the exemplary equation:

$$PV=B[3A(2C+8D)+70E]$$

It should be noted that the priority value (PV) is calculated for each of the machines 102, 104, 106 in real-time as the machines 102, 104, 106 may be working on the worksite 100. Each of the machine 102, 104, 106 may then be sorted based on the respective priority value (PV). The machine 102, 104, 106 having a highest priority value (PV) may be monitored on highest priority relative to other machines 102, 104, 106 having a relatively lower priority value (PV). As such, one or more of the machines 102, 104, 106 having relatively higher priority value (PV) may be allocated assets, such as technicians, in order to attend to any service or repair requests on priority.

INDUSTRIAL APPLICABILITY

Figure 4:
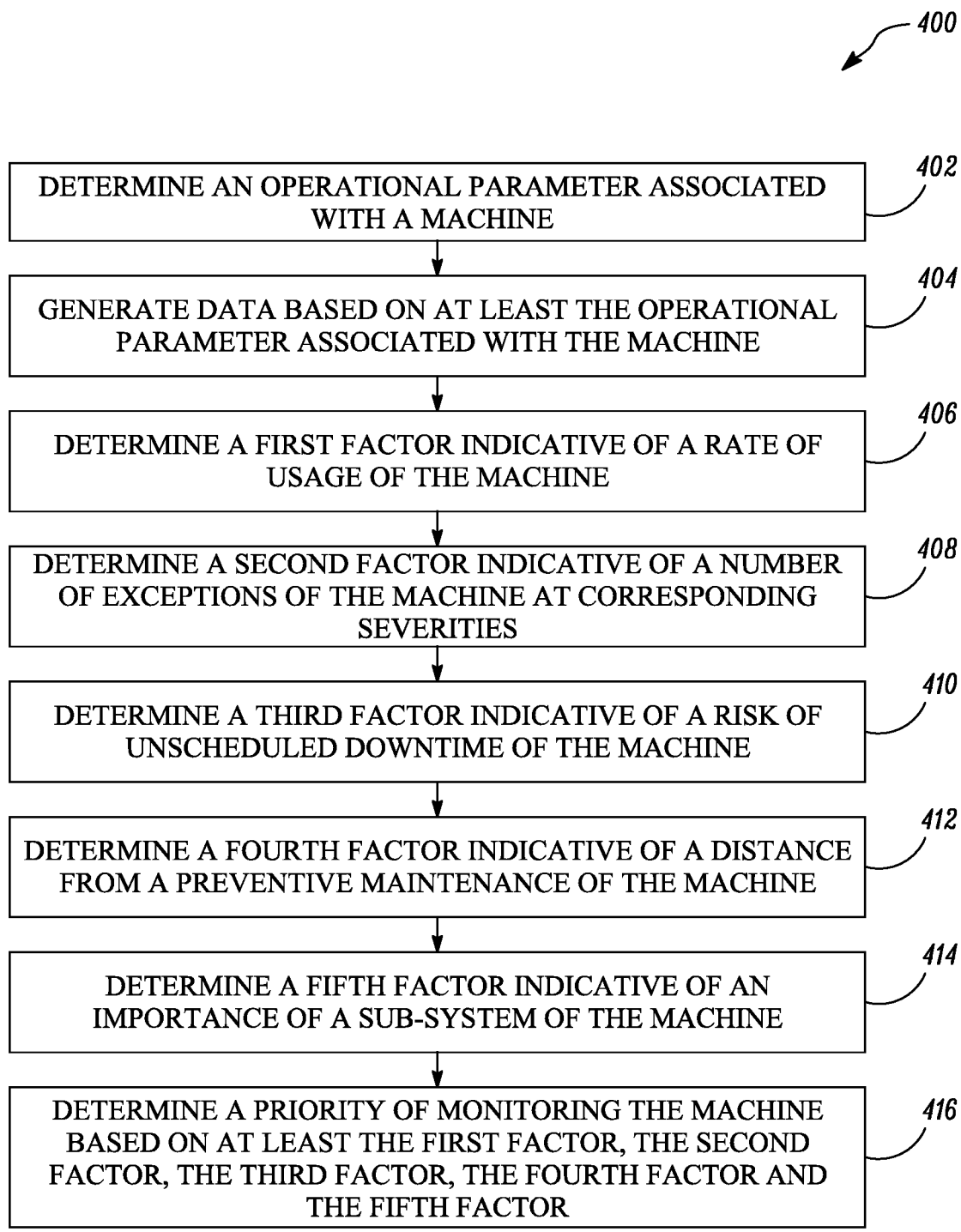
FIG. 4 is a flowchart of a method for determining the priority of monitoring the machine, according to one embodiment of the present disclosure.

The present disclosure relates to a method 400 for determining the priority of monitoring the machine 102. Referring to FIG. 4, a method 400 for determining the priority of monitoring the machine 102 is illustrated. At step 402, the sensor 202 determines the operational parameter associated with the machine 102. At step 404, the data acquisition module 208 generates data based on at least the operational parameter associated with the machine 102. At step 406, the server 210 determines the first factor (A) based on the data obtained from the data acquisition module 208. The first factor (A) is indicative of the rate of usage (ROU) of the machine 102. More specifically, the server 210 determines the first factor (A) based on the number of hours of usage of the machine 102 for the predetermined time duration. At step 408, the server 210 determines the second factor (B) based on the data obtained from the data acquisition module 208. The second factor (B) is indicative of the number of exceptions of the machine 102 at corresponding seventies.

Figure 5:
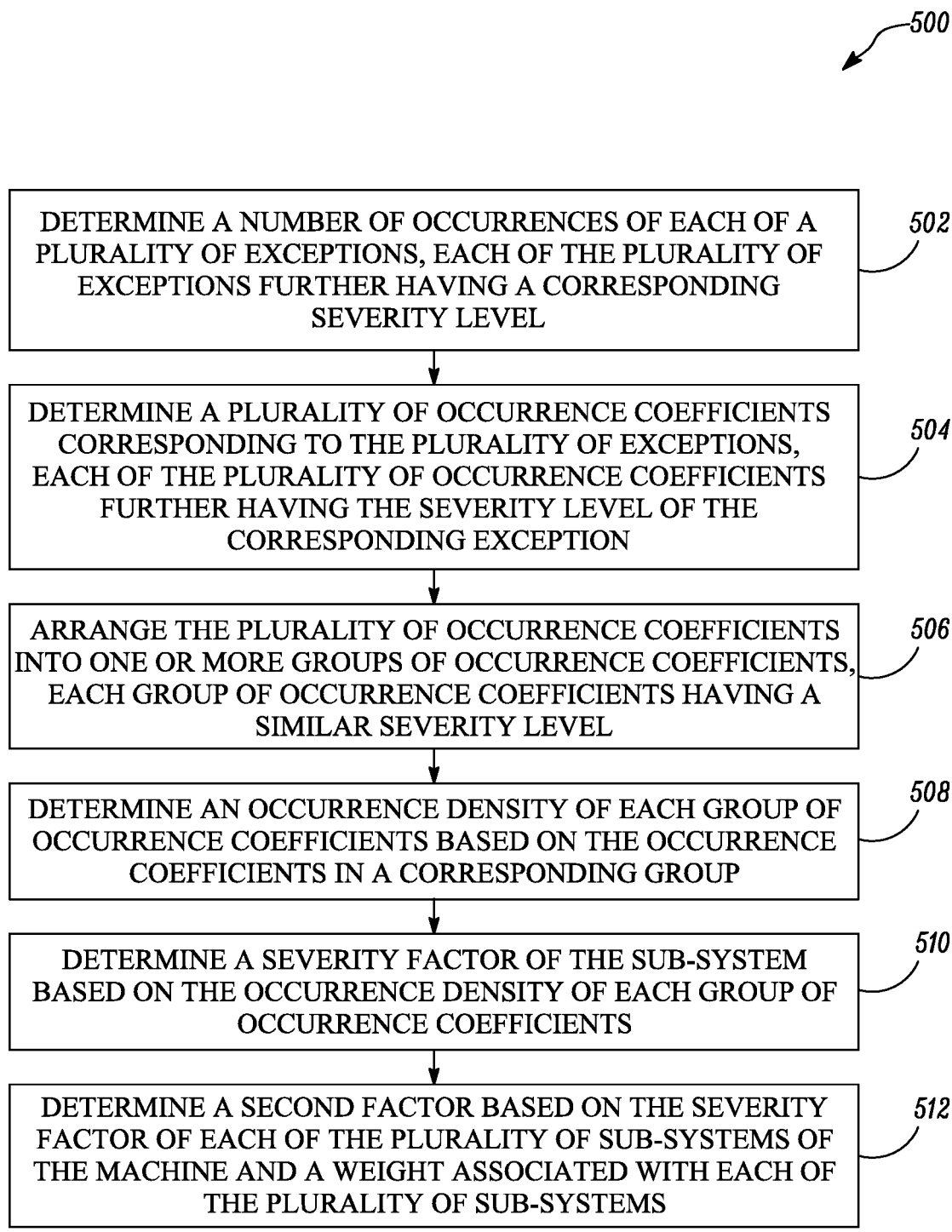
FIG. 5 is a flowchart of a method for determining the second factor, according to one embodiment of the present disclosure.

Referring to FIG. 5, a method 500 for determining the second factor (B) is illustrated. At step 502, the server 210 determines the number of occurrences (X) of each of the plurality of exceptions based on the data obtained from the data acquisition module 208. The plurality of exceptions is associated with the sub-system from the plurality of sub-systems of the machine 102. Each of the plurality of exceptions includes the corresponding severity level. At step 504, the server 210 determines the plurality of occurrence coefficients (OC) corresponding to the plurality of exceptions. Each of the plurality of occurrence coefficients (OC) is determined based on the number of occurrences (X) of the corresponding exception. Each of the plurality of occurrence coefficients (OC) includes the severity level of the corresponding exception.

At step 506, the server 210 arranges the plurality of occurrence coefficients (OC) into the one or more groups of occurrence coefficients (OC). Each group of occurrence coefficients (OC) includes the severity level similar with respect to one another. At step 508, the server 210 determines the occurrence density (OD) of each group of occurrence coefficients (OC) based on the occurrence coefficients (OC) in the corresponding group. At step 510, the server 210 determines the severity factor (SF) of the sub-system based on the occurrence density (OD) of each group of occurrence coefficients (OC). At step 512, the server 210 determines the second factor (B) based on the severity factor (SF) of each of the plurality of sub-systems of the machine 102 and the weight associated with each of the plurality of sub-systems.

Referring to FIG. 4, at step 410, the server 210 determines the third factor (C) based on the data obtained from the data acquisition module 208. The third factor (C) is indicative of the risk of unscheduled downtime (RUD) of the machine 102. More specifically, the server 210 determines the third factor (C) based on at least the complexity of the machine 102, the power rating of the machine 102, the number of sub-system abuse events associated with the machine 102, the number of payload overload events associated with the machine 102, the fuel consumption rate of the machine 102, the number of unscheduled downtime events of the sub-system of the machine 102, the number of injector failures of the machine 102, and the mean time between filter change of the machine 102.

At step 412, the server 210 determines the fourth factor (D) based on the data obtained from the data acquisition module 208. The fourth factor (D) is indicative of the distance from the preventive maintenance of the machine 102. More specifically, the server 210 determines the fourth factor (D) based on at least the number of days from the preventive maintenance (X1), the mean time between shutdowns (MTBS) associated with the machine 102, the frequency of the preventive maintenance (PMF) of the machine 102, the first factor (A) and the third factor (C). At step 414, the server 210 determines the fifth factor (E) based on the user input obtained at the user interface and the data obtained from the data acquisition module 208. The fifth factor (E) is indicative of the importance of the sub-system of the machine 102. More specifically, the server 210 is configured to receive the user input indicative of the high importance level of the sub-system. The server 210 is further configured to determine the number of occurrences of the exception based on the data obtained from the data acquisition module 208. The exception is associated with the sub-system having the high importance level. The server 210 is further configured to set the fifth factor (E) at the high value from the default value if the number of occurrences of the exception is greater than zero.

At step 416, the server 210 determines the priority of monitoring the machine 102 based on at least the first factor (A), the second factor (B), the third factor (C), the fourth factor (D) and the fifth factor (E). More specifically, the server 210 determines the priority of monitoring the machine 102 based on at least the predetermined relationship between the first factor (A), the second factor (B), the third factor (C), the fourth factor (D) and the fifth factor (E). The predetermined relationship is based on the interaction between the first factor (A), the second factor (B), the third factor (C), the fourth factor (D) and the fifth factor (E). The predetermined relationship is also based on the weight associated with each of the first factor (A), the second factor (B), the third factor (C), the fourth factor (D) and the fifth factor (E).

The system 200 and the method 400 is used to determine the priority of monitoring the machine 102. In the illustrated embodiment, the system 200 and the method 400 is described with reference to the machine 102 present on the worksite 100. It should be noted that the system 200 and the method 400 is structurally and operationally application to each of the machines 104, 106 present on the worksite 100. In other embodiments, the system 200 and the method 400 may be incorporated at a dealer level for site-to-site level applications, a manufacturer level for dealer-to-dealer level applications, and so on, based on application requirements, with little or no modification to the existing system.

As such, the system 200 and the method 400 may have wide applications, in turn, providing compatibility, flexibility, and usability. Additionally, the system 200 and the method 400 provides priority-based allocation of assets, such as technicians, to one or more of the machines 102, 104, 106 on the worksite 100 for monitoring, managing, and/or maintaining the machines 102, 104, 106, in turn, improving productivity, reducing downtime, and reducing costs. Additionally, the system 200 and the method 400 may proactively monitor one or more parameters of the machine 102 in order to anticipate fault or breakdown of one or more components or sub-systems of one or more of the machines 102, 104, 106, thus, providing efficient allocation of assets, improving productivity, reducing downtime, and reducing costs.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A system for determining a priority of monitoring a machine, the system comprising:
 a data acquisition module disposed in communication with a sensor configured to determine an operational parameter associated with the machine, the data acquisition module configured to generate data based on at least the operational parameter associated with the machine; and
 a server disposed in communication with the data acquisition module, the server configured to:
  determine a first factor based on the data obtained from the data acquisition module, wherein the first factor is indicative of a rate of usage of the machine;
  determine a second factor based on the data obtained from the data acquisition module, wherein the second factor is indicative of a number of exceptions of the machine at corresponding severities;
  determine a third factor based on the data obtained from the data acquisition module, wherein the third factor is indicative of a risk of unscheduled downtime of the machine;
  determine a fourth factor based on the data obtained from the data acquisition module, wherein the fourth factor is indicative of a distance from a preventive maintenance of the machine, and wherein the fourth factor is further based on at least a number of days from the preventive maintenance, a mean time between shutdowns associated with the machine, and a frequency of the preventive maintenance of the machine;
  determine a fifth factor based on a user input obtained at a user interface and the data obtained from the data acquisition module, wherein the fifth factor is indicative of an importance of one or more sub-systems of the machine; and
  determine the priority of monitoring the machine based on at least the first factor, the second factor, the third factor, the fourth factor and the fifth factor.

2. The system of claim 1, wherein the server is further configured to determine the priority of monitoring the machine based on at least a predetermined relationship between the first factor, the second factor, the third factor, the fourth factor and the fifth factor.

3. The system of claim 2, wherein the predetermined relationship is based on at least:
an interaction between the first factor, the second factor, the third factor, the fourth factor and the fifth factor; and
a weight associated with each of the first factor, the second factor, the third factor, the fourth factor and the fifth factor.

4. The system of claim 1, wherein the server is further configured to determine the first factor based on a number of hours of usage of the machine for a predetermined time duration.

5. The system of claim 1, wherein the server is further configured to determine the second factor by performing the steps of:
determining a number of occurrences of each of a plurality of exceptions based on the data obtained from the data acquisition module, the plurality of exceptions being associated with one or more sub-systems from a plurality of sub-systems of the machine, each of the plurality of exceptions further having a corresponding severity level;
determining a plurality of occurrence coefficients corresponding to the plurality of exceptions, each of the plurality of occurrence coefficients being determined based on the number of occurrences of the corresponding exception, each of the plurality of occurrence coefficients further having the severity level of the corresponding exception;
arranging the plurality of occurrence coefficients into one or more groups of occurrence coefficients, each group of occurrence coefficients having a similar severity level;
determining an occurrence density of each group of occurrence coefficients based on the occurrence coefficients in a corresponding group;
determining a severity factor of the sub-system based on the occurrence density of each group of occurrence coefficients; and
determining the second factor based on the severity factor of each of the one or more sub-systems of the plurality of sub-systems of the machine and a weight associated with each of the one or more sub-systems of the plurality of sub-systems.

6. The system of claim 1, wherein the server is further configured to determine the third factor based on at least a complexity of the machine, a power rating of the machine, a number of sub-system abuse events associated with the machine, a number of payload overload events associated with the machine, a fuel consumption rate of the machine, a number of unscheduled downtime events of the sub-system of the machine, a number of injector failures of the machine, and a mean time between filter change of the machine.

7. The system of claim 1, wherein the server is further configured to determine the fourth factor based on the first factor and the third factor.

8. The system of claim 1, wherein the server is further configured to:
receive the user input indicative of an importance level above a predetermined level of the sub-system;
determine a number of occurrences of an exception based on the data obtained from the data acquisition module, the exception being associated with the sub-system having the importance level above the predetermined level; and
set the fifth factor at a value above a predetermined value from a default value if the number of occurrences of the exception is greater than zero.

9. A computer-implemented method for determining a priority of monitoring a machine, the method comprising:
determining, by a sensor, an operational parameter associated with the machine;
generating, by a data acquisition module, data based on at least the operational parameter associated with the machine;
determining, by a server, a first factor based on the data obtained from the data acquisition module, wherein the first factor is indicative of a rate of usage of the machine;
determining, by the server, a second factor based on the data obtained from the data acquisition module, wherein the second factor is indicative of a number of exceptions of the machine at corresponding severities;
determining, by the server, a third factor based on the data obtained from the data acquisition module, wherein the third factor is indicative of a risk of unscheduled downtime of the machine, and wherein determining the third factor is further based on at least a complexity of the machine, a power rating of the machine, a fuel consumption rate of the machine, and a mean time between filter change of the machine;
determining, by the server, a fourth factor based on the data obtained from the data acquisition module, wherein the fourth factor is indicative of a distance from a preventive maintenance of the machine;
determining, by the server, a fifth factor based on a user input obtained at a user interface and the data obtained from the data acquisition module, wherein the fifth factor is indicative of an importance of a sub-system of the machine; and
determining, by the server, the priority of monitoring the machine based on at least the first factor, the second factor, the third factor, the fourth factor and the fifth factor.

10. The method of claim 9, wherein determining the priority of monitoring the machine is further based on at least a predetermined relationship between the first factor, the second factor, the third factor, the fourth factor and the fifth factor.

11. The method of claim 10, wherein the predetermined relationship is based on at least:
an interaction between the first factor, the second factor, the third factor, the fourth factor and the fifth factor; and
a weight associated with each of the first factor, the second factor, the third factor, the fourth factor and the fifth factor.

12. The method of claim 9, wherein determining the first factor is further based on a number of hours of usage of the machine for a predetermined time duration.

13. The method of claim 9, wherein the second factor is determined by performing the steps of:
determining a number of occurrences of each of a plurality of exceptions based on the data obtained from the data acquisition module, the plurality of exceptions being associated with a sub-system from a plurality of sub-systems of the machine, each of the plurality of exceptions further having a corresponding severity level;
determining a plurality of occurrence coefficients corresponding to the plurality of exceptions, each of the plurality of occurrence coefficients being determined based on the number of occurrences of the corresponding exception, each of the plurality of occurrence coefficients further having the severity level of the corresponding exception;

arranging the plurality of occurrence coefficients into one or more groups of occurrence coefficients, each group of occurrence coefficients having a similar severity level;

determining an occurrence density of each group of occurrence coefficients based on the occurrence coefficients in a corresponding group; determining a severity factor of the sub-system based on the occurrence density of each group of occurrence coefficients; and determining the second factor based on the severity factor of each of the plurality of sub-systems of the machine and a weight associated with each of the plurality of sub-systems.

14. The method of claim 9, wherein determining the third factor is further based on at least a number of sub-system abuse events associated with the machine, a number of payload overload events associated with the machine, a number of unscheduled downtime events of the sub-system of the machine, and a number of injector failures of the machine.

15. The method of claim 9, wherein determining the fourth factor is further based on at least a number of days from the preventive maintenance, a mean time between shutdowns associated with the machine, a frequency of the preventive maintenance of the machine, the first factor and the third factor.

16. The method of claim 9, wherein determining the fifth factor further comprises:

receiving the user input indicative of an importance level above a predetermined level of a sub-system;

determining a number of occurrences of an exception based on the data obtained from the data acquisition module, the exception being associated with the sub-system having the importance level above the predetermined level; and setting the fifth factor at a value above a predetermined value from a default value if the number of occurrences of the exception is greater than zero.

17. A system for determining a priority of monitoring a plurality of machines, the system comprising:

a data acquisition module disposed in communication with a sensor configured to determine an operational parameter associated with a corresponding machine of the plurality of machines, the data acquisition module configured to generate data based on at least the operational parameter associated with the corresponding machine; and a server disposed in communication with the data acquisition module, the server configured to:

determine a first factor for the corresponding machine based on the data obtained from the data acquisition module, wherein the first factor is indicative of a rate of usage of the machine;

determine a second factor for the corresponding machine based on the data obtained from the data acquisition module, wherein the second factor is indicative of a number of exceptions of the machine at corresponding severities;

determine a third factor for the corresponding machine based on the data obtained from the data acquisition module, wherein the third factor is indicative of a risk of unscheduled downtime of the machine;

determine a fourth factor for the corresponding machine based on the data obtained from the data acquisition module, wherein the fourth factor is indicative of a distance from a preventive maintenance of the machine, and wherein determining the fourth factor is further based on at least a number of days from the preventive maintenance, a mean time between shutdowns associated with the machine, and a frequency of the preventive maintenance of the machine;

determine a fifth factor for the corresponding machine based on a user input obtained at a user interface and the data obtained from the data acquisition module, wherein the fifth factor is indicative of an importance of a sub-system of the corresponding machine; and determine the priority of monitoring the corresponding machine based on at least the first factor, the second factor, the third factor, the fourth factor and the fifth factor.

18. The system of claim 17, wherein the server is further configured to determine the priority of monitoring the corresponding machine based on at least a predetermined relationship between the first factor, the second factor, the third factor, the fourth factor and the fifth factor.

19. The system of claim 18, wherein the predetermined relationship is based on at least:

an interaction between the first factor, the second factor, the third factor, the fourth factor and the fifth factor; and a weight associated with each of the first factor, the second factor, the third factor, the fourth factor and the fifth factor.

20. The system of claim 17, wherein the server is further configured to determine the first factor based on a number of hours of usage of the corresponding machine for a predetermined time duration.

* * * * *